United States Patent
Iwamura et al.

(10) Patent No.: US 8,401,103 B2
(45) Date of Patent: Mar. 19, 2013

(54) PARALLEL DECODER

(75) Inventors: Hideyuki Iwamura, Tokyo (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 831 days.

(21) Appl. No.: 12/230,621

(22) Filed: Sep. 2, 2008

(65) Prior Publication Data

US 2009/0067560 A1 Mar. 12, 2009

(30) Foreign Application Priority Data

Sep. 7, 2007 (JP) ................................. 2007-232471

(51) Int. Cl.
*H04L 23/02* (2006.01)
*H04L 5/12* (2006.01)

(52) U.S. Cl. ........ 375/262; 375/324; 375/265; 375/150; 375/146

(58) Field of Classification Search .................. 375/262, 375/365, 361, 362, 340
See application file for complete search history.

(56) References Cited

U.S. PATENT DOCUMENTS

| | | | | |
|---|---|---|---|---|
| 5,627,856 A | * | 5/1997 | Durrant et al. | 375/150 |
| 5,923,701 A | * | 7/1999 | Nakamura | 375/142 |
| 6,272,123 B1 | * | 8/2001 | Abe | 370/342 |
| 7,623,606 B2 | * | 11/2009 | Shoarinejad et al. | 375/354 |
| 2004/0228424 A1 | * | 11/2004 | Baldwin et al. | 375/343 |

FOREIGN PATENT DOCUMENTS

| | | |
|---|---|---|
| JP | 09-135231 A | 5/1997 |
| JP | 10-112695 A | 4/1998 |
| JP | 2000-269855 A | 9/2000 |
| JP | 2003-317026 | 11/2003 |
| JP | 2004-007754 A | 1/2004 |
| JP | 2004-215220 A | 7/2004 |
| JP | 2007-208746 A | 8/2007 |

OTHER PUBLICATIONS

Sugiyama et al., "HEMT CCD matched filter for spread spectrum communication", 6th Topical Workshop on Heterostructure Microelectronics, (TWHM 2005), Aug. 2005.

* cited by examiner

*Primary Examiner* — Daniel Washburn
*Assistant Examiner* — Qutbuddin Ghulamali
(74) *Attorney, Agent, or Firm* — Rabin & Berdo, P.C.

(57) ABSTRACT

A parallel decoder for decoding a code division multiplexed (CDM) signal. The parallel decoder has two matched filters, both operating at a frequency equal to half the chip rate of the CDM signal. One matched filter correlates odd-numbered chips of the CDM signal with odd-numbered chips of the spreading code. The other matched filter correlates even-numbered chips of the CDM signal with even-numbered chips of the spreading code. The two resulting correlated signals are combined, and the decoded signal is obtained from the combined signal. This arrangement doubles the maximum possible chip rate of the CDM signal.

15 Claims, 12 Drawing Sheets

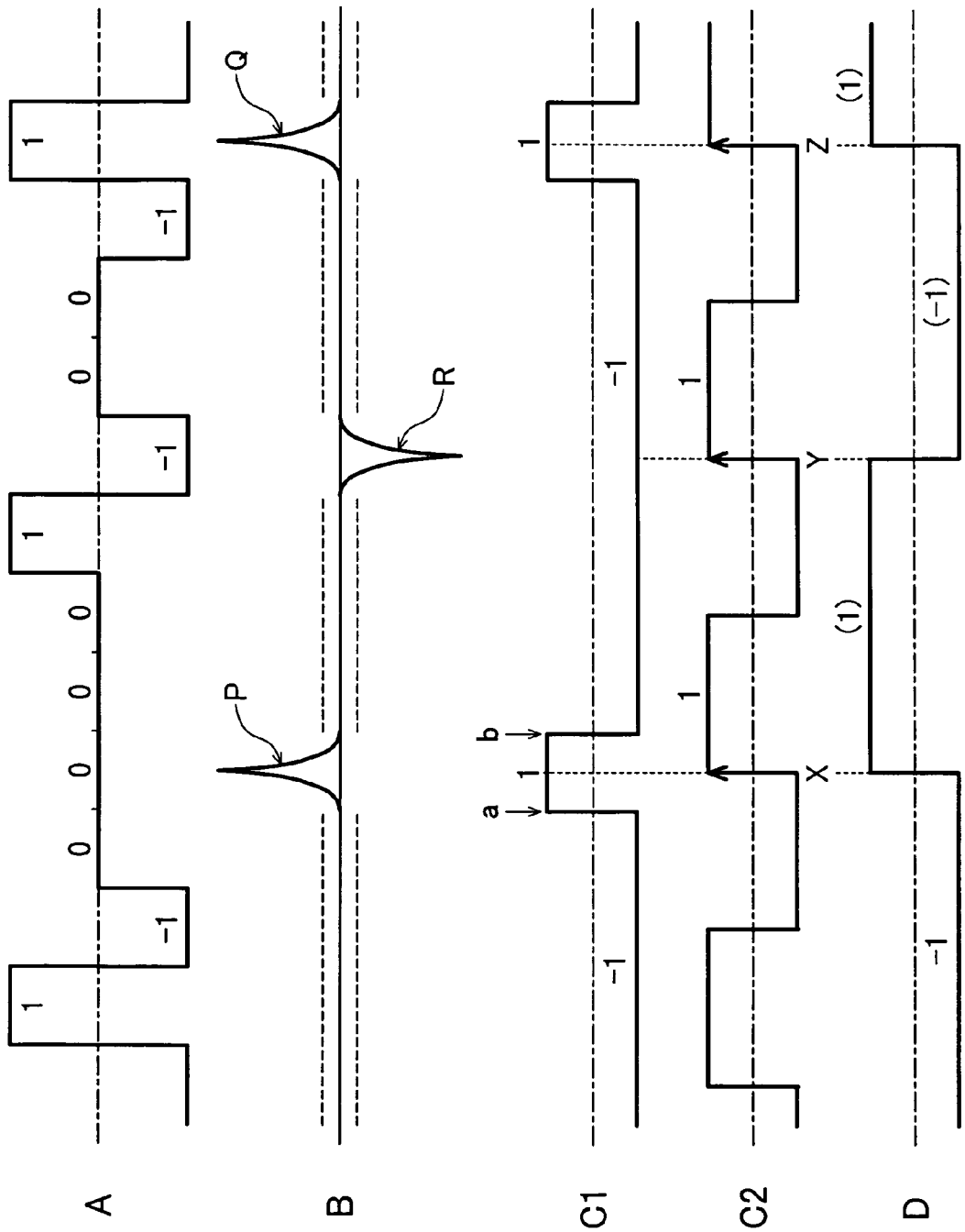

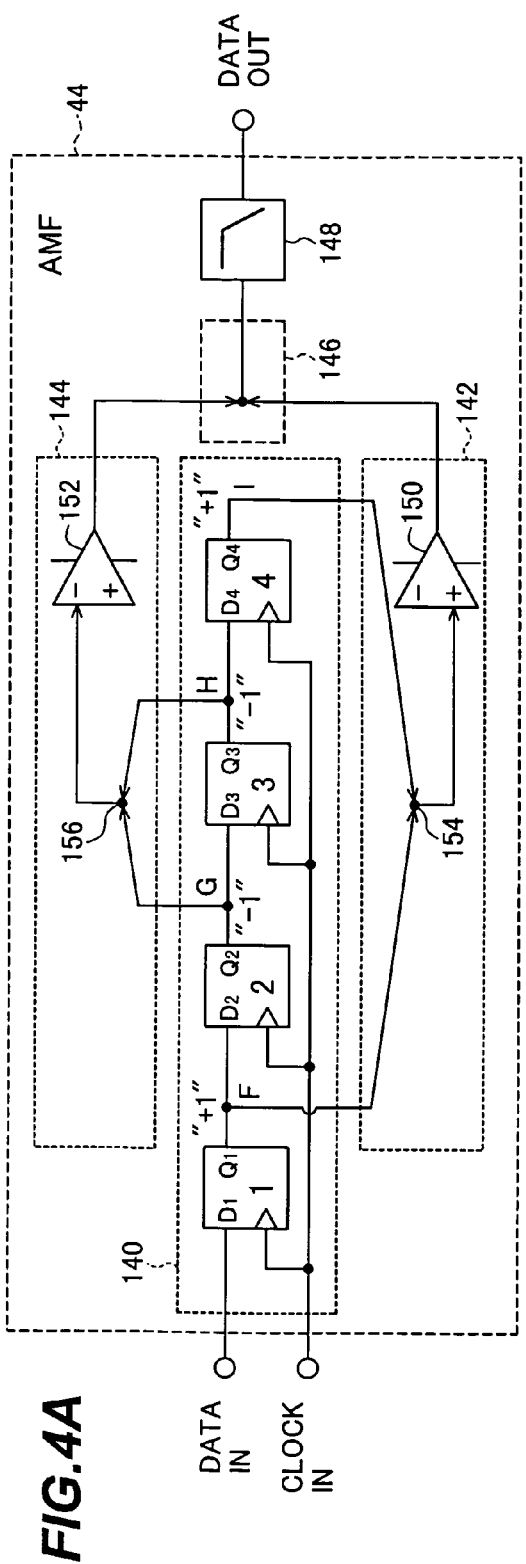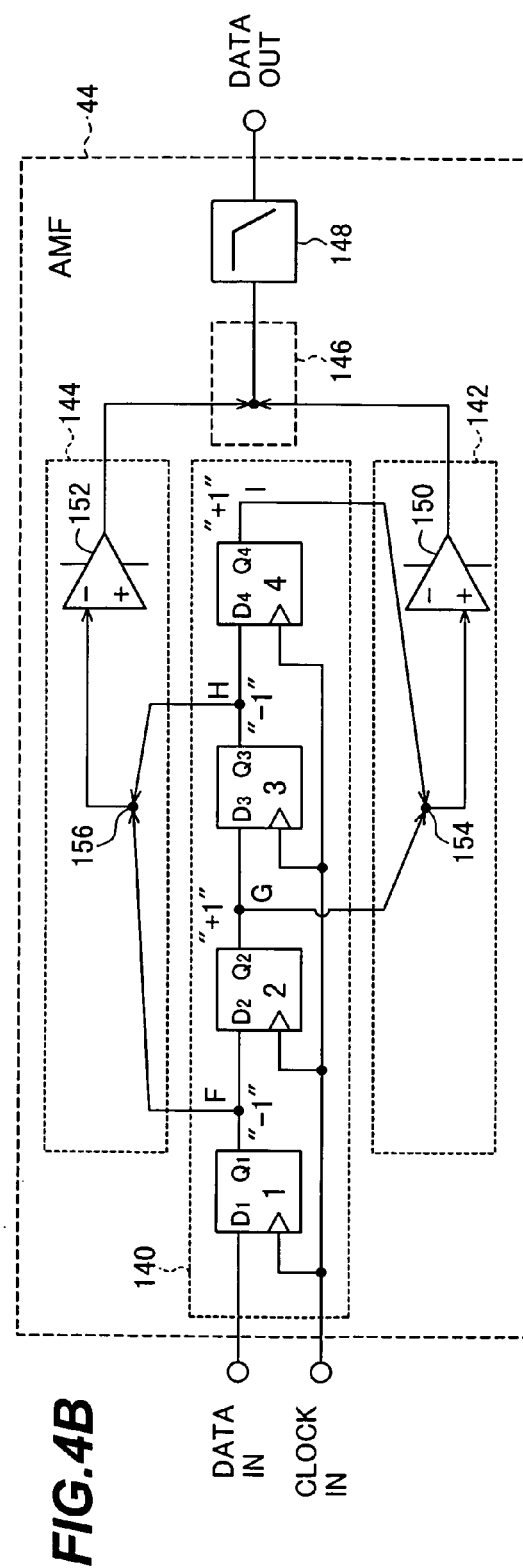

PARALLEL DECODER

BACKGROUND OF THE INVENTION

1. Field of the Invention

The present invention relates to a decoder for an optical communication system that uses code division multiplexing (CDM), more particularly to a parallel decoder.

2. Description of the Related Art

The following documents are referred to below:

Non-patent document 1: Tamai et al., 'Jisedai hikari akusesu, shisutemu COF-PON no kenkyu kaihatsu' (Research and development of COF-PON: a next-generation optical access system), *Oki Technical Review*, Issue 210, Vol. 74, No. 2, April 2007

Non-patent document 2: Kashima et al., 'Ko-QoS maruchi media hikari haishin shisutemu no kenkyu kaihatsu—COF transhiba' (Research and development of high-QoS multimedia optical distribution system—COF transceiver) *Oki Technical Review*, Issue 200, Vol. 71, No. 4, October 2004

Non-patent document 3: Sasase, 'Hikari shisutemu ni okeru hikari fugo bunkatsu tagen setsuzoku gijutsu' (Optical Code Division Multiple Access Techniques in Optical Communication Systems) TELECOMFRONTIER, November 2004

Non-patent document 4: T. Sugiyama et al., 'HEMT CCD MF for Spread Spectrum Communication', 6th Topical Workshop on Heterostructure Microelectronics (TWHM 2005) August 2005

Patent document 1: Sasaki et al., Japanese Patent Application Publication No. 2003-317026, Signed product sum computing element and analog matched filter including the same, Nov. 7, 2003

Passive optical network (PON) systems that use CDM for communication between a provider and users via optical fibers are attracting attention. Known as CDM-on-fiber-PON or COF-PON systems, these systems permit transmission over longer distances than are feasible in more traditional time division multiplexing (TDM) optical access systems. COF-PON also has the advantage of being compatible with wavelength division multiplexing (WDM). A WDM-CDM-PON system is described in non-patent document 1, for example.

Current demands in the optical access network field include faster data transmission rates and higher degrees of multiplexing. COF-PON has natural multiplexing advantages, because it transmits multiple channels bi-directionally over the same wavelength. For high data transmission rates, however, COF-PON requires components that can operate at very high speeds, because each data bit is transmitted not as a single bit but as a sequence of very short chips.

In particular, a COF-PON system requires decoders with matched filters that can operate at the chip rate in order to correlate the received signal with a code signal to recover the transmitted data bits. At present, analog matched filters are used in COF-PON decoder circuits, as disclosed in non-patent documents 1-3 and patent document 1 above, for example, because analog matched filters are superior to digital matched filters in terms of operating speed, device size, and power consumption. In the future, if faster, smaller, lower-power digital matched filters become available, they may replace analog matched filters because they are easier to manufacture and can be produced in high volumes at a low cost.

At present, COF-PON systems have achieved data transmission rates of about one hundred megabits per second per user at a chip rate of about two gigachips per second. These systems employ analog matched filters operating at a clock frequency of about two gigahertz, which represents the limit of current analog matched filter technology, as described in non-patent document 4 above. One of the factors that limits analog matched filter operating speed in a COF-PON system is poor charge transfer efficiency due to substantial residual charge in the long shift register that is needed to accommodate the long codes that must be used in order to multiplex a large number of channels.

COF-PON systems employ spreading codes in which the entire code length is used to spread each bit into a sequence of chips, so that the chip rate is the product of the bit rate and the code length, and the code length is equal to the coding gain.

It would be highly desirable to provide higher data transmission rates with existing analog matched filter technology. Through diligent research, the present inventor found that this can be done by means of a decoder having two analog filters that operate in parallel.

SUMMARY OF THE INVENTION

An object of the present invention is to correlate and decode a received signal that has been encoded at a comparatively high chip rate, using a clock signal with a frequency lower than the chip rate.

Another object of the present invention is to decode a received signal that has been encoded with a comparatively long spreading code by using a shift register shorter than the spreading code length.

The invention accomplishes these objects by providing a parallel decoder having a pair of matched filters.

The parallel decoder receives an input electrical signal created by using a spreading code having a chip rate to encode a data signal having a bit rate.

The input electrical signal may be the result of optical-to-electrical conversion of an encoded data signal transmitted over an optical fiber.

From the input electrical signal, a control signal generator in the parallel decoder generates a first clock signal having a frequency equal to half the chip rate, a second clock signal also having a frequency equal to half the chip rate, and third clock signal having a frequency equal to the data rate.

A splitter splits the input electrical signal into an identical pair of split electrical signals. A first matched filter, operating in synchronization with the first clock signal, generates a first correlated signal from one split electrical signal. A second matched filter, operating in synchronization with the second clock signal, generates a second correlated signal from the other split electrical signal. A decision section, operating in synchronization with the third clock signal, generates the decoded signal from the first and second correlated signals.

The parallel decoder may also include a delay circuit inserted between the splitter and the first matched filter to delay the split electrical signal received by the first matched filter by one chip period. In this case, the first and second clock signals may be mutually in phase.

Alternatively, the delay circuit may be omitted and the first and second clock signals may be mutually complementary. In this case, a delay circuit may be inserted between the first matched filter and the decision section to delay the first correlated signal by one chip period.

The first and second matched filters may be analog matched filters. In this case, the decision section may include a combiner for adding the first and second correlated signals to obtain a combined signal, and a threshold decision circuit for comparing the combined signal with a threshold.

Alternatively, the first and second matched filters may be digital matched filters. In this case, the decision section may include a logic gate for performing a logic operation such as an AND operation on the first and second correlated signals, preferably followed by a threshold decision circuit operating in synchronization with the third clock signal to eliminate pulses that do not represent decoded data.

By splitting the input electrical signal and correlating the resulting pair of input electrical signals with two matched filters, the present invention enables each matched filter to operate at a clock frequency equal to only half the chip rate instead of the full chip rate.

Each matched filter has to correlate the input electrical signal with only half of the spreading code, so it can employ a shift register only half as long as is necessary when a single matched filter correlates the entire spreading code.

When a delay circuit is included, the peaks of both correlated signals are correctly aligned with the third clock signal. This is particularly advantageous when analog matched filters are used, because then the peaks in the correlated signals do not have well-defined shapes with steep leading and trailing edges; they rise and fall more gradually and somewhat irregularly. The more slowly the first and second analog matched filters operate, the more the shapes of the peak pulses become distorted. Without a delay circuit, the peaks in the first and second correlated signals only partially reinforce each other in the combined signal. With a delay circuit, the peaks in the first and second correlated signals occur simultaneously, so even if they are individually distorted, the combined signal has a distinct peak that can be recognized by the threshold decision circuit with a low error rate.

BRIEF DESCRIPTION OF THE DRAWINGS

In the attached drawings:

FIG. 3 is a timing diagram illustrating the decoding of the CDM signal, showing waveforms of the CDM signal as input to an analog matched filter (A), the correlated signal output by the analog matched filter (B), the signal output from the decision circuit after thresholding (C1), the data clock signal (C2), and the decoded signal (D);

FIG. 4A is a circuit diagram of an analog matched filter for decoding a first channel signal in a conventional COF-PON decoder;

FIG. 4B is a circuit diagram of an analog matched filter for decoding a second channel signal in the conventional COF-PON decoder;

DETAILED DESCRIPTION OF THE INVENTION

Figure 1:
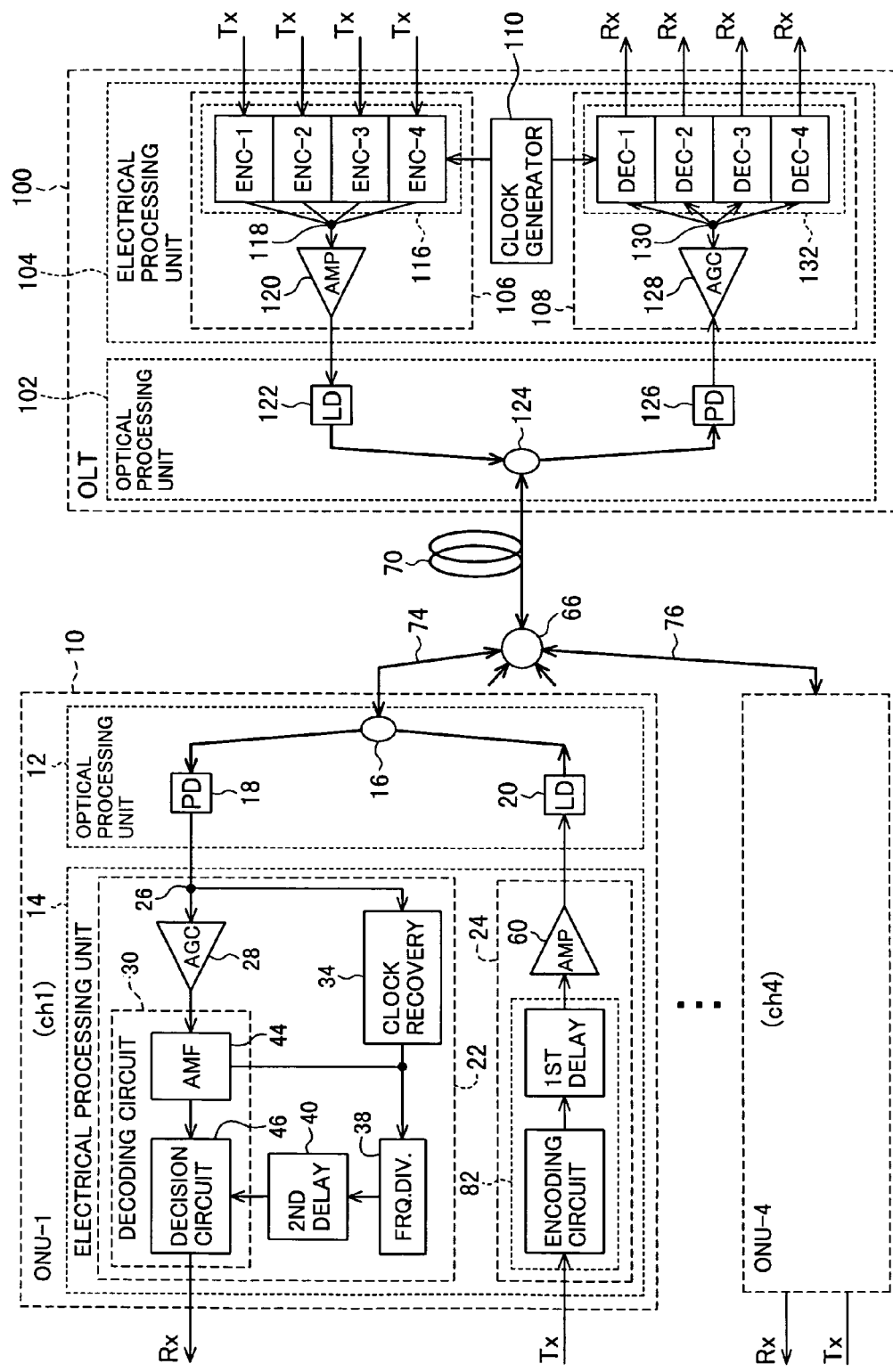
FIG. 1 is a schematic block diagram of a COF-PON system.

Three novel parallel decoders embodying the invention will now be described with reference to the attached drawings, in which like elements are indicated by like reference characters.

Since the novel parallel decoders may be used to replace parts of a conventional COF-PON system, first the configuration and operation of the conventional COF-PON system will be described, and the principles of encoding and decoding in a COF-PON system will be explained. It will be appreciated, however, that applications of the novel parallel decoders are not limited to COF-PON systems.

The exemplary COF-PON system in FIG. 1 has four subscribers (users) with respective optical network units ONU-1 to ONU-4, collectively referred to as ONUs 10 below. Each ONU 10 is assigned a different spreading code for use in coding and decoding.

An optical line termination unit (OLT) 100 performs bidirectional optical CDM communication with the four ONUs 10. The OLT 100 and ONUs 10 are interconnected through a passive optical coupler 66, from which an optical fiber 70 leads to the OLT 100 and a plurality of optical branch fibers lead to the ONUs 10. FIG. 1 shows the branch fiber 74 leading to ONU-1 and the branch fiber 76 leading to ONU-4.

The abbreviations ch1 to ch4 are used in FIG. 1 to identify the four communication channels established through the OLT 100 to the four ONUs 10. Tx denotes a signal to be transmitted, and Rx denotes a received signal. Signals are referred to as upstream if transmitted from the ONUs 10 to the OLT 100, and as downstream if transmitted from the OLT 100 to the ONUs 10.

Each ONU 10 has an optical processing unit 12 and an electrical processing unit 14. The optical processing unit 12 includes an optical coupler 16, a photonic receiving element 18 such as a photodiode (PD), and a photonic transmitting element 20 such as a laser diode (LD). The photonic transmitting element 20 converts an upstream electrical signal received from the electrical processing unit 14 to an upstream optical signal. The optical coupler 16 routes the upstream optical signal to the passive optical coupler 66, and routes a downstream optical CDM signal received from the passive optical coupler 66 to the photonic receiving element 18. The photonic receiving element 18 converts the downstream optical CDM signal to a downstream electrical CDM signal.

The electrical processing unit 14 includes a receiving section 22 for receiving and decoding the downstream electrical CDM signal and outputting a decoded signal, and a transmitting section 24 for generating the upstream electrical signal.

The receiving section 22 includes an electrical signal splitter 26, an automatic gain control (AGC) circuit 28, a decoding circuit 30, a clock recovery circuit 34, a frequency divider (FRQ. DIV.) 38, and a delay circuit 40 (denoted '2nd delay' in FIG. 1). The decoding circuit 30 includes an analog matched filter (AMF) 44 and a decision circuit 46.

The downstream electrical CDM signal is routed through the electrical signal splitter 26 and automatic gain control circuit 28 to the decoding circuit 30, and through the electrical signal splitter 26 to the clock recovery circuit 34. The clock recovery circuit 34 recovers a chip clock signal from the downstream electrical CDM signal. The frequency divider 38 divides the frequency of the chip clock signal to obtain a data clock signal, that is, a bit clock signal. The delay circuit 40 delays the data clock signal for proper alignment with the bit boundaries.

In the decoding circuit 30 in ONU-1, the analog matched filter 44, operating in synchronization with the chip clock signal output from the clock recovery circuit 34, correlates the electrical CDM signal with the spreading code assigned to ONU-1. The decision circuit 46, operating in synchronization with the delayed data clock signal output from the delay circuit 40, converts the resulting correlated signal to a decoded data signal and outputs the decoded data.

The transmitting section 24 includes a driver 60 and an encoding unit 82. An amplifier (AMP) is used as the driver 60. The encoding unit 82 includes an encoding circuit and a first delay circuit (denoted '1st delay' in FIG. 1). The encoding circuit employs an exclusive-NOR (EXNOR) gate circuit, which is a combination of an exclusive-OR (EXOR) gate and an inverter.

An upstream signal to be transmitted from ONU-1 to the OLT 100 in FIG. 1 is input to the encoding unit 82 and encoded. The encoded signal is routed through the first delay circuit to the driver 60 and amplified. The amplified encoded signal is input to the photonic transmitting element 20, converted to an optical signal, and routed through the optical coupler 16 to the passive optical coupler 66.

ONU-2 (not shown) to ONU-4 operate similarly but with different data and different spreading codes. The passive optical coupler 66 combines the upstream optical signals from all four ONUs into a single upstream optical CDM signal, which is transmitted through the optical fiber 70 to the OLT 100. The purpose of the first delay circuit in each ONU is to align the timing of the upstream signals so that the signals transmitted by all four ONUs arrive at the OLT 100 with identical bit and chip timing.

Like the ONUs 10, the OLT 100 has an optical processing unit 102 and an electrical processing unit 104. The optical processing unit 102 includes a photonic transmitting element (LD) 122, an optical coupler 124, and a photonic receiving element (PD) 126. The electrical processing unit 104 includes a transmitting section 106, a receiving section 108, and a clock generator 110.

The transmitting section 106 includes an encoding section 116 comprising four parallel encoding circuits, denoted ENC-1 to ENC-4, which encode signals to be transmitted to ONUs ONU-1 to ONU-4, respectively, using the same codes as assigned to the corresponding ONUs. The signals output from the four encoding circuits are combined in a signal combiner 118 and the combined signal is input to a driver 120 such as an amplifier (AMP).

The photonic transmitting element 122 in the optical processing unit 102 converts the output of amplifier 120 to a downstream optical CDM signal, which is routed through the optical coupler 124, optical fiber 70, and passive optical coupler 66 to the ONUs 10.

The upstream optical CDM signal received from the ONUs 10 is routed through the optical coupler 124 to the photonic receiving element 126, converted to an electrical CDM signal, and supplied to the receiving section 108.

The receiving section 108 includes an automatic gain control circuit 128, a splitter 130, and a decoding section 132. The automatic gain control circuit 128 adjusts the level of the received electrical CDM signal. The adjusted electrical CDM signal is supplied through the splitter 130 to four decoding circuits, denoted DEC-1 to DEC-4, in the decoding section 132. The decoding circuits DEC-1 to DEC-4 use the same codes as the encoding circuits in ONU-1 to ONU-4, respectively, to decode the received electrical CDM signal, thereby providing four channels of received data (Rx ch1 to Rx ch4).

Chip clock and data clock signals are supplied from a clock generator 110 to the transmitting section 106 and the receiving section 108. These clock signals are the basic clock signals in the COF-PON system. The chip clock signals extracted by the clock recovery circuits 34 in the ONUs 10 replicate the chip clock signal generated by the clock generator 110.

The CDM encoding process will now be described with reference to FIG. 2, which illustrates the simplified case of two channels. Time is indicated horizontally and signal values are indicated vertically.

In this example, both channels employ spreading codes with lengths of four chips. A first spreading code (1, 0, 0, 1) is assigned to the first channel. A second spreading code (1, 0, 1, 0) is assigned to the second channel. The exemplary data to be transmitted are 1, 0, 1, 0, . . . on the first channel (waveform A1) and 1, 1, 0, 0, . . . on the second channel (waveform B1). In the drawing, the binary values '1' and '0' are replaced by equivalent values of '1' and '−1', to simplify the description of the coding process. The dash-dot lines accordingly represent the zero level of each signal.

In practice, '1' may denote the presence of an electrical or optical pulse and '0' or '−1' may denote the absence of such a pulse. Alternatively, '1' may denote the absence of a pulse and '0' or '−1' may denote the presence of a pulse. In analog signal processing, the signal levels may be biased so that the positive values in FIG. 2 represent positive voltages, the negative values represent negative voltages, and the dash-dot lines represent zero volts.

All four chips of the assigned code are used to encode each bit of the transmitted signal. The chip rate of the encoded signal is therefore four times the baseband data rate or bit rate of the signal to be transmitted.

When the spreading code signals C and data signals D are represented by values of 1 and −1 instead of 1 and 0, encoding is equivalent to multiplying D by C. In the descriptions below, when necessary, the channel number will be indicated by subscripts, such as $C_1$ and $D_1$ for the code and data on the first channel, for example. With this notation, $C_1$=(1, −1, −1, 1) and $C_2$=(1, −1, 1, −1).

When the first bit (1) of the data to be transmitted on the first channel is multiplied by the code (1, −1, −1, 1) of the first channel, the result is (1×1, 1×−1, 1×−1, 1×1) or (1, −1, −1, 1). The next bit (−1) is similarly encoded to (−1, 1, 1, −1).

Figure 2:
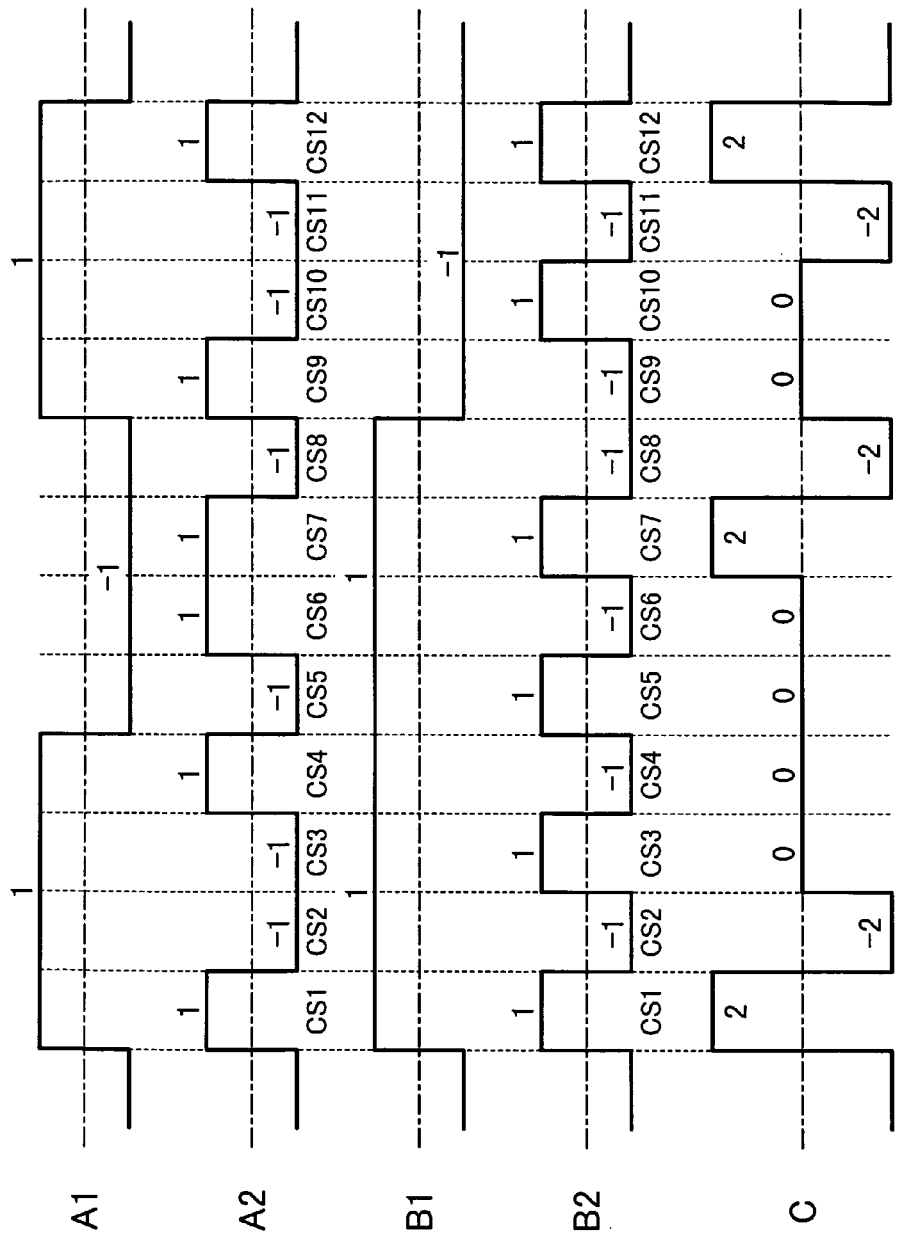
FIG. 2 is a timing diagram illustrating the encoding of transmitted signals, showing waveforms of data signals (A1 and B1) to be transmitted on two channels, the encoded data signals (A2 and B2), and the combined CDM signal (C)

The encoded data are transmitted on the first channel as the chip sequence (1, −1, −1, 1, −1, 1, 1, −1, 1, −1, −1, 1, . . . ) shown in chip slots CS1-CS12 . . . in waveform A2 in FIG. 2.

On the second channel, similar coding of the data (1, 1, −1, . . . ) by the code (1, −1, 1, −1) yields the chip sequence (1, −1, 1, −1, 1, −1, 1, −1, −1, 1, −1, 1, . . . ) shown in chip slots CS1-CS12 . . . in waveform B2.

In the CDM signal, these encoded waveforms A2, B2 are combined by summing their values to obtain (1+1, −1−1, −1+1, 1−1, −1+1, 1−1, 1+1, −1−1, 1−1, −1+1, −1−1, 1+1, . . . ) or (2, −2, 0, 0, 0, 2, −2, 0, 0, −2, 2, . . . ), as shown in waveform C in FIG. 2.

Next the decoding of this CDM signal to extract the data for the first channel will be described with reference to FIG. 3.

Although the CDM waveform C in FIG. 2 has values of '2' and '−2', since the transmitted signal is attenuated in the optical fibers and undergoes electrical/optical conversion and automatic gain control, the received signal has new levels, which are arbitrarily denoted '1' and '−1' in FIG. 3. Waveform A (1, −1, 0, 0, 0, 0, 1, −1, 0, 0, −1, 1, . . . ) in FIG. 3 thus represents the same CDM signal as waveform C in FIG. 2.

This signal is input to an analog matched filter that correlates it with the code (1, −1, −1, 1) assigned to the first channel. As indicated by waveform B in FIG. 3, the output of the analog matched filter has positive and negative peaks at points at which the bit boundaries in the received CDM signal are aligned with the beginning and end of the spreading code in the decoder. The positive peaks P, Q correspond to '1' values in the transmitted data, and negative peaks R correspond to '−1' values in the transmitted data. At other positions, the matched filter output has values (not explicitly shown) closer to zero.

The matched filter output is compared with a threshold level by a decision circuit. The threshold is preset to a level below the positive peaks P, Q. The result of this thresholding operation, schematically illustrated by waveform C1, has a value of '1' when the matched filter output exceeds the threshold and a value of '−1' when the matched filter output is below the threshold.

The thresholded signal is latched in synchronization with the data clock signal shown by waveform C2 to produce the received data signal indicated by waveform D. In ONU-1 in FIG. 1, the thresholding and latching operations are both performed by the decision circuit 46. The thresholding operation may be performed by use of a comparator and the latching operation by use of a D-type flip-flop.

In waveform C1, the analog matched filter output attains the threshold at point 'a', exceeds the threshold between points 'a' and 'b', and falls below the threshold again at point 'b'. The thresholding operation converts the analog signal schematically depicted by waveform B to a digital signal with only two levels as shown in waveform C1.

The latching operation depicted in FIG. 3 is synchronized with rising edges of the clock signal in waveform C2. At each rising edge of the clock signal, the current value of the thresholded signal C1 is latched and held until the next rising edge. At rising edge X, for example, the thresholded signal C1 has a positive value ('1'), which is latched and output in waveform D until the next rising edge Y of the clock signal. At rising edge Y, the thresholded signal C1 has a negative value ('−1'), which is latched and output in waveform D until the next rising clock edge Z.

The data (1, −1, 1, . . . ) latched at clock edges X, Y, Z, . . . are the same as the data (1, −1, 1, . . . ) transmitted by ONU-1 in waveform A1 in FIG. 2.

It will be appreciated that the timing of the above operation must be accurately adjusted so that the peaks of the correlated signal waveform B coincide with rising edges of the clock waveform C2. The necessary timing adjustment is accomplished by the first and second delay circuits in the electrical processing unit 14 in FIG. 1.

The reason for the appearance of the peaks in waveform B is as follows. Consider an instant at which a chip representing data bits $D_1, D_2, D_3, \ldots$ encoded by respective spreading code values $C_1, C_2, C_3, \ldots$ used on a plurality of channels arrives at the decoder. The received chip has the value $$(D_1 \times C_1) + (D_2 \times C_2) + (D_3 \times C_3) + \ldots .$$

When the analog filter in the first channel correlates the received signal with the spreading code of the first channel, it multiplies this received chip value by the code value $C_1$, obtaining $$(D_1 \times C_1 \times C_1) + (D_2 \times C_2 \times C_1) + (D_3 \times C_3 \times C_1) + \ldots .$$

Regardless of whether $C_1$ is 1 or −1, the product $C_1 \times C_1$ is always 1, while the products $C_2 \times C_1$, $C_3 \times C_1$ and so on are 1 and −1 at random. In the correlation process, calculations such as the above are performed simultaneously for all chips in the spreading code, consistently obtaining $D_1$ but obtaining $D_2$ and $-D_2$, $D_3$ and $-D_3$, and so on about equally often. When the results of these simultaneous operations are added to obtain the correlated output, the value $D_1$ is reproduced with a gain equal to the code length while the other values $D_2$ and $-D_2$, $D_3$ and $-D_3$, and so on cancel out to zero, or approximately zero.

In waveform B in FIG. 3, a positive peak P, Q or negative peak R corresponding to $4D_1$ is produced once every four chips, when the bit boundaries of the received signal are aligned with the beginning and end of the code used in the decoder. The rest of the correlated signal, including the contributions of $D_2$ and $-D_2$, $D_3$ and $-D_3$ and so on as well as noise components, is generally confined to the area indicated by the dotted lines.

Next, the structure and operation of the analog matched filters will be described with reference to FIGS. 4A and 4B.

As shown in these drawings, an analog matched filter comprises an analog shift register 140, a positive adder 142, a negative adder 144, an analog adder 146, and a low-pass filter 148. The analog shift register 140 is a charge coupled device (CCD) with a number of cells equal to the code length. In the present example, there are four cells (1-4) with respective data input terminals ($D_1$-$D_4$), data output terminals ($Q_1$-$Q_4$), and clock input terminals. The positive adder 142 comprises a non-inverting amplifier 150 and a signal combiner 154. The negative adder 144 comprises an inverting amplifier 152 and a signal combiner 156.

The analog matched filter has a clock input terminal connected to the clock input terminals of the analog shift register 140, a data input terminal connected to the data input terminal $D_1$ of the first cell in the analog shift register 140, and a data output terminal connected to the low-pass filter 148.

The analog matched filter in FIG. 4A is configured for the code used in first channel in the present example (1, 0, 0, 1, equivalent to 1, −1, −1, 1, indicated in the drawing as "+1", "−1", "−1", "+1"). Accordingly, the data output terminals $D_1$, $D_4$ of the first and fourth cells of the analog shift register 140 are connected at positions F, I through signal combiner 154 to the non-inverting amplifier 150, and the data output terminals $D_2$, $D_3$ of the second and third cells of the analog shift register 140 are connected at positions G, H through signal combiner 156 to the inverting amplifier 152, so that each four successive received chips are correlated with the four code chip values. The output at F is multiplied by "+1", the output at G by "−1", and so on.

In the analog matched filter in FIG. 4B, the output at F is multiplied by "−1", the output at G by "+1", the output at H by "−1", and the output at I by "+1", corresponding to the spreading code (−1, 1, −1, 1) used in the second channel.

The received electrical CDM signal, e.g. waveform A in FIG. 3, is supplied to the data input terminals of both of the analog matched filters in FIGS. 4A and 4B. The chip clock signal is supplied to the clock input terminals.

After the first four chips of waveform A have been input to the analog shift registers 140, the first chip (with level denoted '1') has been shifted to the fourth cell of the analog shift register 140 and the fourth chip (with level '0') occupies the first cell. The output voltages at positions F, G, H, I, in arbitrary units, are (0, 0, −1, 1).

In the analog matched filter in FIG. 4A, assuming unity gain, the output voltage of the non-inverting amplifier 150 is 1 (derived from the sum of the 0 and 1 outputs at positions F and I) and the output voltage of the inverting amplifier 152 is also 1 (derived by inverting the sum of the 0 and −1 outputs at positions G and H). The analog adder 146 combines these positive output voltages to produce the positive peak P in waveform B in FIG. 3 corresponding to the first bit ('1') in waveform A1 in FIG. 2. The low-pass filter 148 filters the output of the analog adder 146 to preserve variations occurring at the bit rate while attenuating high frequency noise.

In the analog matched filter in FIG. 4B, the output voltage of the non-inverting amplifier 150 is again 1 (derived from the sum of the 0 and 1 outputs at positions G and I) and the output voltage of the inverting amplifier 152 is again 1 (derived by inverting the sum of the 0 and −1 outputs at positions F and H), producing another positive peak, corresponding to the first bit ('1') in waveform B1 in FIG. 2.

After the next four chips of waveform A in FIG. 3 have been input to the analog shift registers 140, the output voltages at positions F, G, H, I are (−1, 1, 0, 0).

In the analog matched filter in FIG. 4A, the output voltage of the non-inverting amplifier 150 is now −1 and the output voltage of the inverting amplifier 152 is also −1. The analog adder 146 combines these negative output voltages to produce negative peak R in waveform B in FIG. 3, corresponding to the second bit ('−1') in waveform A1 in FIG. 2.

In the analog matched filter in FIG. 4B, the output voltage of the non-inverting amplifier 150 is still 1 and the output voltage of the inverting amplifier 152 is still 1, producing a positive peak corresponding to the second bit ('1') in waveform B1 in FIG. 2.

After the next four chips of waveform A in FIG. 3 have been input to the analog shift registers 140, the output voltages at positions F, G, H, I are (1, −1, 0, 0).

In the analog matched filter in FIG. 4A, the output voltage of the non-inverting amplifier 150 is 1 and the output voltage of the inverting amplifier 152 is also 1. The analog adder 146 combines these positive output voltages to produce positive peak Q in waveform B in FIG. 3, corresponding to the third bit ('1') in waveform A1 in FIG. 2.

In the analog matched filter in FIG. 4B, the output voltage of the non-inverting amplifier 150 is now −1 and the output voltage of the inverting amplifier 152 is now −1, producing a negative peak that corresponds to the third bit ('−1') in waveform B1 in FIG. 2.

Continuing in this way, the analog matched filter in FIG. 4A extracts the data transmitted on the first channel and the analog matched filter in FIG. 4B extracts the data transmitted on the second channel.

The signal combiners 154, 156 may be configured as analog adders similar to the analog adders 146.

Although four-chip codes have been described above for simplicity, in actual systems 16-chip or 32-chip codes are often used. The principle of operation is the same, but the coding gain is higher, resulting in stronger peaks in the correlated waveforms.

Figure 5A:
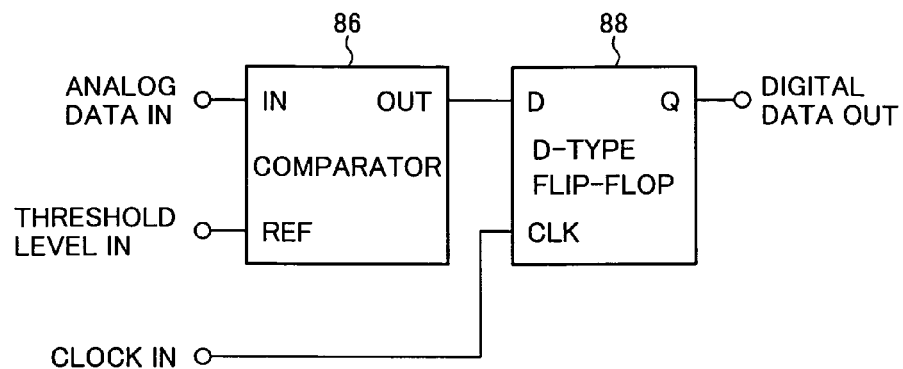
FIG. 5A is a schematic block diagram of the decision section in the conventional decoder.

Referring to FIG. 5A, the decision circuit 46 in FIG. 1 comprises a comparator 86 and a D-type flip-flop 88.

The comparator 86 has an analog data input terminal (IN) for receiving the correlated signal output from an analog matched filter, a reference level input terminal (REF) for receiving a threshold voltage level, and an output terminal (OUT) from which a binary signal is output with a '1' level when the analog data input exceeds the threshold voltage level and a '0' level when the analog data input is less than the threshold voltage level.

The D-type flip-flop 88 has a data input terminal (D) connected to the output terminal of the comparator 86, a clock input terminal (CLK) receiving the delayed data clock signal from delay circuit 40 in FIG. 1, and a data output terminal (Q) for output of the decoded data.

Figure 5B:
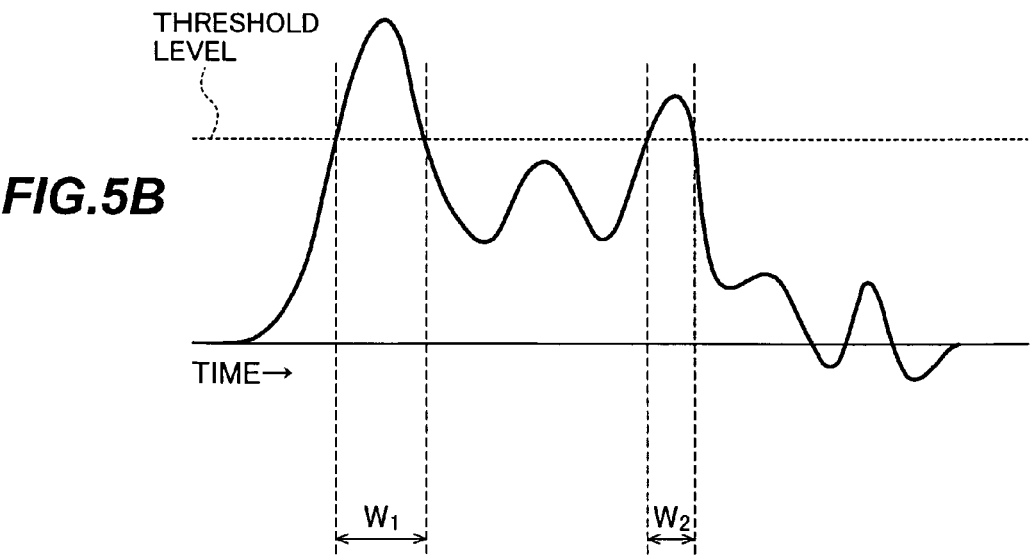
FIG. 5B shows an exemplary temporal waveform of a decoded signal output from the analog matched filter in the conventional COF-PON decoder.
Figure 5C:
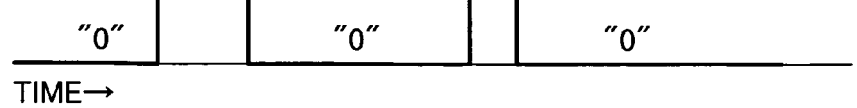
FIG. 5C shows the temporal waveform of the corresponding signal output from the decision section in the conventional COF-PON decoder.

FIG. 5B schematically shows an analog data waveform input to the comparator 86 and indicates the threshold level. FIG. 5C shows the corresponding output from the comparator 86. Although '1' and '0' data are reproduced, the '1' pulses have varying widths $W_1$, $W_2$ depending on the varying shape of the analog data waveform. The function of the delay circuit 40 in FIG. 1 is to assure that the delayed data clock signal causes the D-type flip-flop 88 to latch the output of the comparator 86 at points within these pulse widths $W_1$, $W_2$. The D-type flip-flop 88 then produces a digital data output signal in which the data pulses have uniform widths equal to the data clock period.

First Embodiment

A parallel decoder according to a first embodiment of the invention will now be described with reference to FIGS. 6 and 7.

Figure 6:
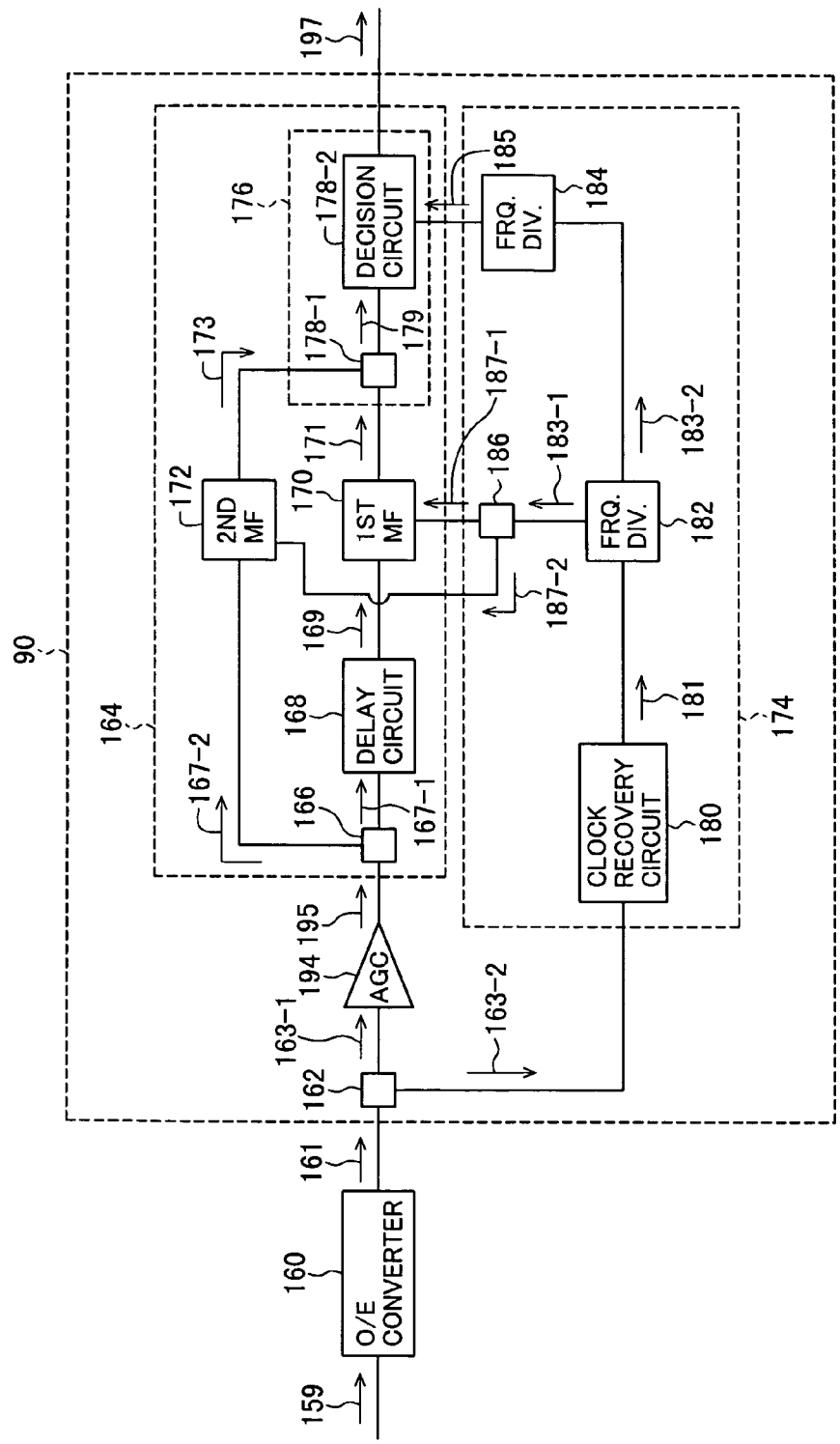
FIG. 6 is a schematic block diagram of a parallel decoder illustrating a first embodiment of the invention.

The parallel decoder 90 in FIG. 6 receives an encoded signal that has been transmitted from an external source as an optical pulse signal 159 and converted by an optical-to-electrical (O/E) converter 160 such as a photodiode to an input electrical signal 161. The input electrical signal 161 is split into two identical split electrical signals, also referred to below as input electrical signal 163-1 and input electrical signal 163-2, by a splitter 162 in the parallel decoder 90. The first input electrical signal 163-1 is supplied to an automatic gain control circuit 194, which adjusts its level and outputs the adjusted input electrical signal 195 to a decoding section 164. The second input electrical signal 163-2 is supplied to a control signal generator 174.

In the decoding section 164, the adjusted input electrical signal is split by a splitter 166 into two more identical split electrical signals, referred to below as split electrical signal 167-1 and split electrical signal 167-2. Split electrical signal 167-1 is supplied to a delay circuit 168, which outputs a delayed input signal 169 to a first matched filter (MF) 170. The first matched filter 170 generates a first correlated signal 171. Split electrical signal 167-2 is supplied directly to a second matched filter 172, which generates a second correlated signal 173.

The first and second correlated signals 171, 173 are supplied to a combiner 178-1 in a 176. The combiner 178-1 combines the two signals and outputs the combined signal as a combined correlated signal 179 to a threshold decision circuit 178-2 in the decision section 176. The threshold decision circuit 178-2 latches the combined correlated signal 179 in synchronization with a bit clock signal 185 supplied from a frequency divider 184, compares each latched value with a predetermined threshold value, and thereby generates a decoded data signal 197.

If the first and second matched filters 170, 172 are analog matched filters, an analog adder is used as the combiner 178-1.

If the first and second matched filters 170, 172 are digital matched filters, a logical AND circuit may be used as the combiner 178-1. In this case, the switching threshold in the AND circuit makes the combiner 178-1 function as a threshold decision circuit; the output of the combiner 178-1 is a logical '1' when both correlated signals are above the switching threshold, and a logical '0' or '−1' when either correlated signal is below the switching threshold. The combiner 178-1 is not, however, synchronized with the bit clock signal 185. The function of the threshold decision circuit 178-2 is to synchronize the thresholded logical output signal 179 with the bit clock signal 185 to produce data pulses of uniform width and reject logical output values that are due to noise rather than to peaks in the correlated signals.

The digital matched analog filters may generate bi-level correlated signals, that is, logic signals, which are combined by the AND logic circuit in the combiner 178-1 and then synchronized with the bit clock signal 185 by the threshold decision circuit 178-2.

The electrical input signal 163-2 output from the splitter 162 is supplied to the clock recovery circuit 180 in the control signal generator 174. The clock recovery circuit 180 extracts a chip clock signal 181 having a frequency equal to the chip rate and outputs it to a frequency divider (FRQ. DIV.) 182. The frequency divider 182 divides the chip clock signal 181 and generates a pair of divided clock signals 183-1, 183-2 with half the chip-rate frequency of the chip clock signal 181.

Divided clock signal 183-1 is supplied to a splitter 186 and split into a first clock signal 187-1 and a second clock signal 187-2, which are supplied to the first matched filter 170 and second matched filter 172, respectively. Divided clock signal 183-2 is supplied to a frequency divider 184, converted to a clock signal with a frequency equal to the data transmission rate (bit rate), and output as a third clock signal or bit clock signal 185 to the threshold decision circuit 178-2.

If the spreading code length is $2^N$ and so the chip rate is $2^N$ times the bit rate, where N is an integer equal to or greater than two, then half the chip rate is $2^{N-1}$ times the bit rate, so a divide-by-2 clock divider may be used as frequency divider 182 and a divide-by-$2^{N-1}$ clock divider may be used as frequency divider 184. If the code length is eight chips ($2^N=8$, N=3), for example, a divide-by-two clock divider may be used as frequency divider 182 and a divide-by-four clock divider may be used as frequency divider 184.

The operation of the parallel decoder 90 in the first embodiment will now be described with reference to FIG. 7. For convenience in description of the waveforms, the exemplary data to be transmitted are 1, 1, 0, . . . , shown as 1, 1, −1, . . . The spreading code in this example is an eight-chip code with chip values 1, 0, 0, 1, 0, 1, 1, 0, or if expressed algebraically, 1, −1, −1, 1, −1, 1, 1, −1. Coding is carried out in the conventional way, each data bit being encoded as a series of eight chips.

The CDM optical pulse signal 159 input to the optical-to-electrical converter 160 in the stage preceding the parallel decoder 90 includes a component obtained by encoding the data 1, 1, 0, . . . with the code (1, 0, 0, 1, 0, 1, 1, 0), where '1' denotes the presence of a pulse and '0' denotes the absence of a pulse. In the electrical signal waveforms in FIG. 7, the corresponding signal levels are denoted '1' and '−1'.

Although the CDM signal normally includes other components representing data transmitted on other channels, since these other components are reduced to approximately zero in the correlation process, for simplicity they will be ignored in the following description.

Multiplying each data bit in waveform A by the spreading code (1, −1, −1, 1, −1, 1, 1, −1) yields waveform B, which is present in the encoded input electrical signal 195.

Waveform C1 represents the delayed input signal 169 and waveform C2 represents split electrical signal 167-2. Because the delayed input signal 169 is delayed by one chip with respect to split electrical signal 167-2, waveform C2 is shifted one chip to the left with respect to waveform C1. For convenience, in the drawing waveform C1 is shown aligned with waveform B.

The clock signals 187-1, 187-2 input to the matched filters 170, 172 both have the timing indicated by waveform D, with a frequency equal to half the chip rate. Each clock period in waveform D is equal to two chip periods in waveforms B, C1, and C2.

Waveform E represents the first correlated signal 171 output from the first matched filter 170, generated from waveform C1 in synchronization with the first clock signal 187-1. The first matched filter 170 latches the chips (1, −1, −1, 1) in alternate chip slots S1, S3, S5, S7 in waveform C1 in synchronization with the rising clock edges P, Q, R, S in waveform D, and multiplies them by alternate code chips (1, −1, −1, 1) in the spreading code. The resulting products are all '1', producing a peak in the correlated output indicated by positive pulse $a_1$ in waveform E. Similarly, in the next two bit periods, the first matched filter 170 produces another positive peak $a_2$ and a negative peak $a_3$, corresponding to data values '1' and '−1'.

Waveform F represents the second correlated signal 173 output from the second matched filter 172, generated from waveform C2 in synchronization with the second clock signal 187-2. The second matched filter 172 latches the chips (−1, 1, 1, −1) in alternate chip slots S1, S3, S5, S7 in waveform C2 in synchronization with the same rising clock edges P, Q, R, S in waveform D, and multiplies them by the remaining code chips (−1, 1, 1, −1) in the spreading code. The resulting products are again all '1', producing a peak in the correlated output indicated by positive pulse $b_1$ in waveform F. In the next two data bit periods, the second matched filter 172 produces another positive peak $b_2$ and a negative peak $b_3$, again corresponding to data values '1' and '−1'.

If the chips in the spreading code are numbered from $C_1$ to $C_8$, then $$(1, -1, -1, 1, -1, 1, 1, -1) = (C_1, C_2, C_3, C_4, C_5, C_6, C_7, C_8)$$

The spreading code can be divided into four pairs of chips (1, −1,/−1, 1,/−1, 1,/1, −1). Each pair of chips includes one odd-numbered chip and the following even numbered chip ($C_1$, $C_2$/$C_3$, $C_4$/$C_5$, $C_6$/$C_7$, $C_8$). The first matched filter 170 is structured according to the values of the odd numbered chips ($C_1$, $C_3$, $C_5$, $C_7$); the second matched filter 172 is structured according to the values of the even-numbered chips ($C_2$, $C_4$, $C_6$, $C_8$).

Because the first and second matched filters 170, 172 operate in synchronization with clock signals 187-1, 187-2 having a frequency equal to half the chip rate (waveform D), the first matched filter 170 latches only the chips in the odd-numbered slots S1, S3, S5, S7 in waveform C1, and the second matched filter 172 latches only the chips in the odd-numbered slots S1, S3, S5, S7 in waveform C2. Because of the one-chip offset between the delayed input signal 169 and split electrical signal 167-2, however, the first matched filter 170 latches the first, third, fifth and seventh chips in each bit interval in waveform B, while the second matched filter 172 latches the second, fourth, sixth, and eighth chips in the same bit interval in waveform B. By decoding the first, third, fifth, and seventh chips of waveform B with the corresponding chips ($C_1$, $C_3$, $C_5$, $C_7$) of the spreading code, the first matched filter 170 produces peak $a_1$ in waveform E. By decoding the second, fourth, sixth, and eighth chips of waveform B with the corresponding chips ($C_2$, $C_4$, $C_6$, $C_8$) of the spreading code, the second matched filter 172 produces peak $b_1$ in waveform F. Peaks $a_1$ and $b_1$ are produced simultaneously because the first matched filter 170 and second matched filter 172 operate in synchronization with the same clock signal. Similarly, peaks $a_2$ and $b_2$ are produced simultaneously, and peaks $a_3$ and $b_3$ are produced simultaneously.

Waveform G is the waveform of the combined correlated signal 179 output by the combiner 178-1. Because the peaks in the first and second correlated signals 171, 173 output by the first matched filter 170 and second matched filter 172 occur simultaneously, when combined by the combiner 178-1, the peaks reinforce each other, producing the stronger peaks $d_1$, $d_2$, $d_3$ in waveform G.

Waveform G reproduces the data in waveform A. Although waveform A has a non-return-to-zero (NRZ) format and waveform G has a return-to-zero format (RZ), the threshold decision circuit 178-2 operates in synchronization with the bit clock signal 185 output by the frequency divider 184, and compares only the peak values $d_1$, $d_2$, $d_3$, . . . of the combined correlated signal 179 with the threshold value, ignoring other parts of the combined correlated signal 179. The decoded data signal 197 therefore accurately represents the transmitted data (1, 1, −1, . . . ) shown in waveform A.

The structure of the first matched filter 170 and second matched filter 172 will now be described in more detail, under the continuing assumption that the spreading code is (1, 0, 0, 1, 0, 1, 1, 0) or, in algebraic notation, (1, −1, −1, 1, −1, 1, 1, −1).

Figure 8:
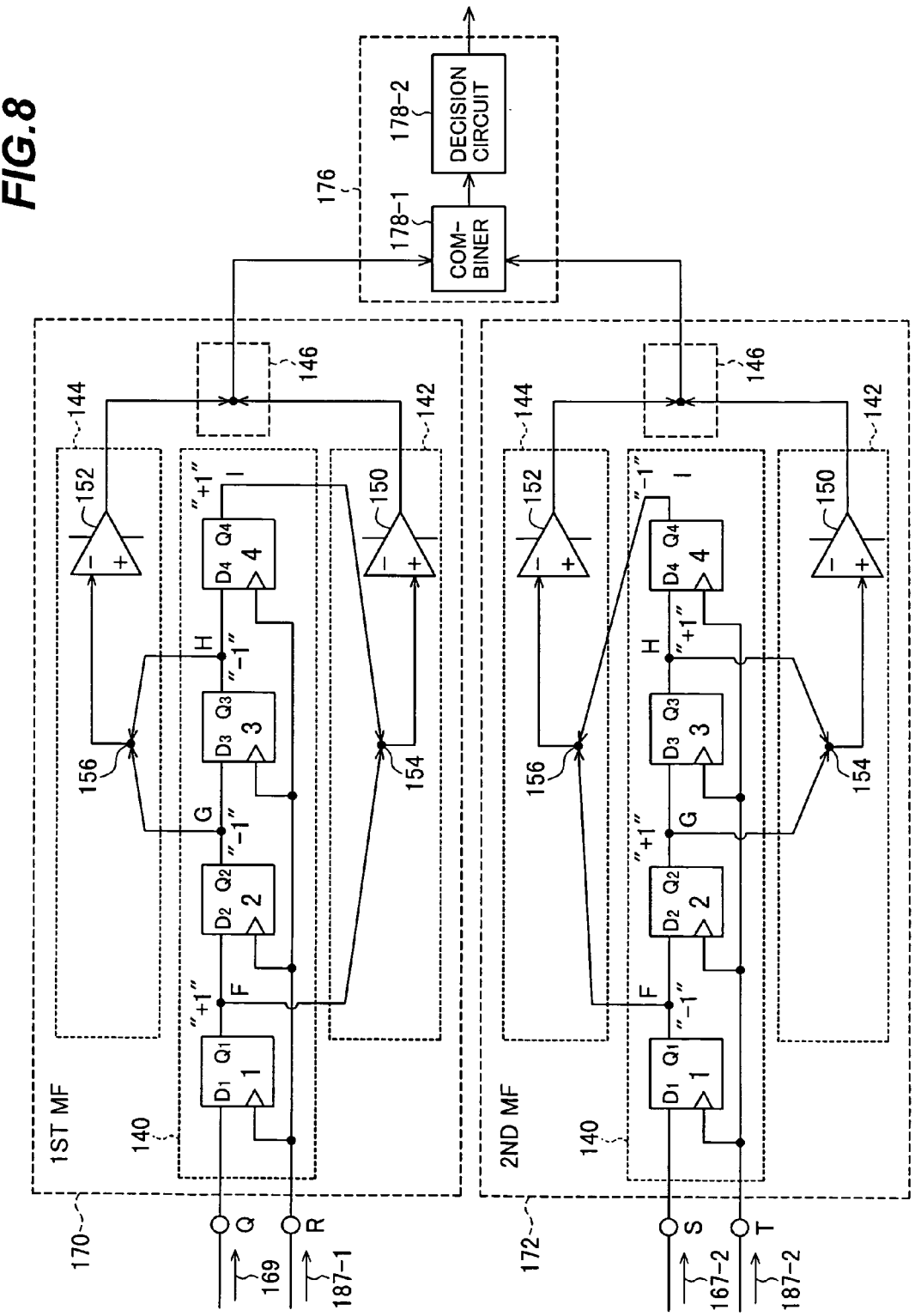
FIG. 8 is a more detailed block diagram of the matched filters and decision section in the parallel decoder in the first embodiment.

FIG. 8 illustrates the internal structure of the first and second matched filters 170, 172, also indicating their input terminals and their interconnections to the decision section 176.

Aside from the lack of the output low-pass filter 148 in FIG. 4A, the first matched filter 170 in FIG. 8 has the same internal structure as the analog matched filter in FIG. 4A, comprising a shift register 140, a non-inverting amplifier 150, an inverting amplifier 152, and an analog adder 146. Points F and I are connected through signal combiner 154 to the non-inverting amplifier 150 while points G and H are connected through signal combiner 156 to the inverting amplifier 152, enabling the first matched filter 170 is structured to correlate its input signal 169 with the odd-numbered chips $C_1$, $C_3$, $C_5$, $C_7$ (shown as "+1", "−1", "−1", "+1") of the spreading code.

The second matched filter 172 has a similar internal structure, except that points F and I are connected through signal combiner 156 to the inverting amplifier 152 and points G and H are connected through signal combiner 154 to the non-inverting amplifier 150, enabling the second matched filter 172 to correlate its input signal 167-2 with the even-numbered chips $C_2$, $C_4$, $C_6$, $C_8$ (shown as "−1", "+1", "+1", "−1") of the spreading code.

The first matched filter 170 receives the delayed input signal 169 at its data input terminal Q and the first clock signal 187-1 at its clock input terminal R. Operating in the same way as the analog matched filter in FIG. 4A, the first matched filter 170 outputs a correlated signal derived from the odd-numbered chips of the spreading code and the odd-numbered chips of the received electrical input signal to the decision section 176.

The second matched filter 172 receives split electrical signal 167-2 at its data input terminal S and the second clock signal 187-2 at its clock input terminal T, and outputs a correlated signal derived from the even-numbered chips of the spreading code and the even-numbered chips of the received electrical input signal to the decision section 176.

The peak signals output by the first matched filter 170 and second matched filter 172 at the end of each bit interval in the electrical input signal always reinforce each other, because they are obtained by decoding chips generated from the same data value. The combined signal output by the combiner 178-1 in the decision section 176 accordingly has the same amplitude gain as if it had been produced by a single analog matched filter operating at the chip-rate frequency, instead of by two parallel matched filters 170, 172 operating at only half the chip-rate frequency.

The threshold decision circuit 178-2 compares the output of the combiner 178-1 with a threshold value set well below the positive peak level of waveform G in FIG. 7, but well above the negative peak level, thereby obtaining an accurately decoded data signal.

Figure 7:
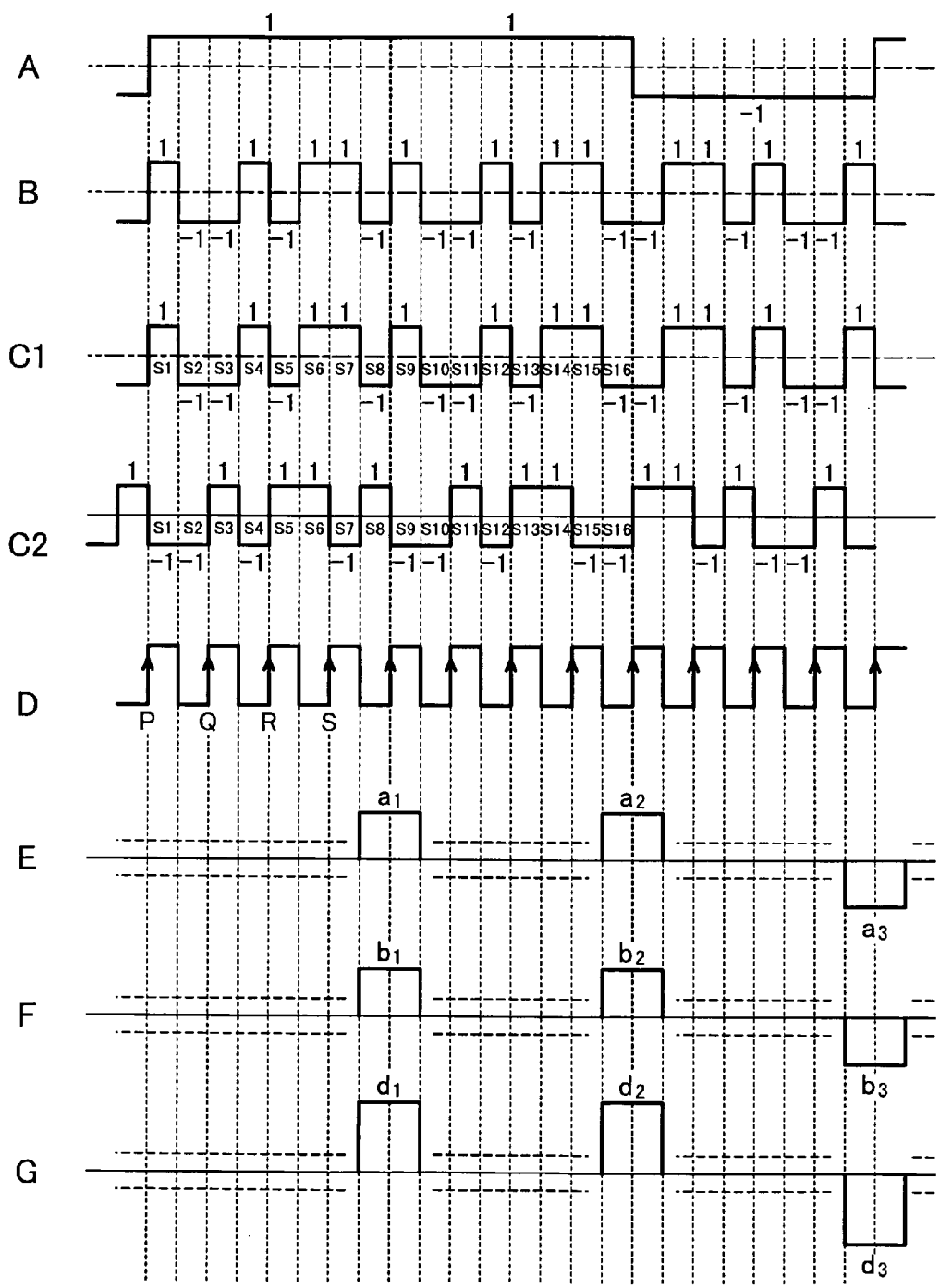
FIG. 7 is a timing diagram illustrating the operation of the parallel decoder in the first embodiment, showing temporal waveforms of a data signal to be encoded and transmitted (A), the encoded transmitted signal (B), the split electrical signals (C1 and C2), the first and second clock signals (D), the first and second correlated signals (E and F), and the decoded signal (G)

Since the first and second matched filters 170, 172 are analog filters, their actual output waveforms are more complex than waveforms E and F in FIG. 7, but they still have the property that their peak values reinforce each other, so that the peak amplitude gain of the output of the combiner 178-1 is twice the peak amplitude gain of the individual outputs of the first matched filter 170 and second matched filter 172. In contrast, the noise amplitude of the output of the combiner 178-1 is less than 1.5 times the noise amplitude of the individual outputs of the first matched filter 170 and second matched filter 172. The output of the combiner 178-1 therefore has a higher signal-to-noise ratio than the outputs of the first matched filter 170 and second matched filter 172, making it possible to recover data that could not have been recovered using a single analog matched filter operating at the same speed as the first and second matched filters 170, 172.

The threshold decision circuit 178-2 produces a digital output signal with a rectangular waveform, the high level of which represents '1' data while the low level represents '0' data. In the present example, the decoded data signal 197 in FIG. 6 represents the data '1, 1, 0, . . . ').

Second Embodiment

Figure 9:
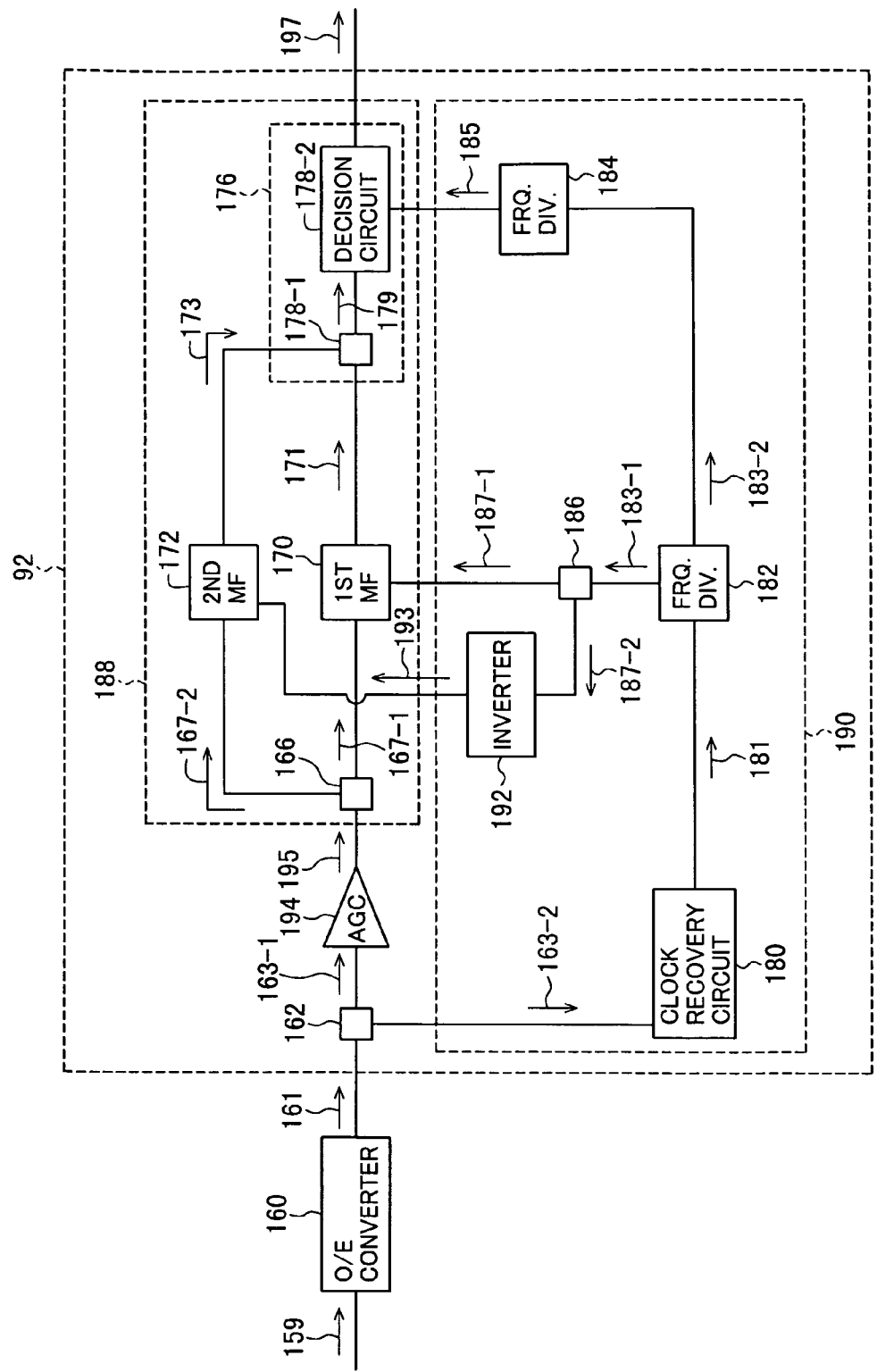
FIG. 9 is a schematic block diagram of a parallel decoder illustrating a second embodiment.

The structure and operation of the parallel decoder in the second embodiment will be described with reference to FIGS. 9 and 10.

The parallel decoder 92 in the second embodiment comprises a control signal generator 190 for generating and outputting control signals and a decoding section 188 for receiving and decoding the input electrical signal 195 and outputting the decoded signals.

The parallel decoder 92 differs from the parallel decoder 90 in the first embodiment only in that the decoding section 188 does not include a delay circuit, and the control signal generator 190 includes an inverter 192 for inverting the phase of the second clock signal 187-2.

As in the first embodiment, splitter 166 outputs a pair of split electrical signals 167-1, 167-2 identical to the adjusted input electrical signal 195 obtained from the automatic gain control circuit 194. Differing from the first embodiment, both split electrical signals 167-1 and 167-2 are supplied directly to the matched filters 170 and 172. Split electrical signal 167-1 is not delayed as in the first embodiment.

In the control signal generator 190, as in the first embodiment, the clock recovery circuit 180 receives split electrical signal 163-2 from the splitter 162 and generates a chip clock signal 181 with a frequency equal to the chip rate. The chip clock signal 181 is supplied to frequency divider 182 and divided into a pair of identical clock signals 183-1, 183-2, each having a frequency equal to half the chip rate.

Clock signal 183-1 is input to splitter 186 and further split to obtain identical clock signals 187-1, 187-2. The first clock signal 187-1 is supplied to the first matched filter 170. Clock signal 187-2 is input to the inverter 192, inverted, and output as a complementary clock signal 193 to the second matched filter 172. Clock signal 183-2 is input to frequency divider 184, which outputs the bit clock signal 185 to the threshold decision circuit 178-2.

The operation of the second embodiment will now be described with reference to the waveforms in FIG. 10, using the same exemplary data (1, 1, 0, . . . ) as in the first embodiment.

Waveform A illustrates the transmitted data in un-encoded form. Waveforms B and C illustrate the transmitted data in encoded form. Waveform B is the waveform of split electrical signal 167-1; waveform C is the waveform of split electrical signal 167-2.

Waveform D1 is the waveform of the clock signal 187-1 supplied to the first matched filter 170. Waveform D2 is the waveform of the complementary clock signal 193 supplied to the second matched filter 172. The frequency of both of these clock signals 187-1, 193 is half the chip rate of the encoded signals in waveforms B and C. These two clock signals differ from each other in phase by one-half clock period ($\pi$ radians).

The first matched filter 170 latches split electrical signal 167-1 (waveform B) in synchronization with the rising edges P, Q, R, S, . . . of clock signal 187-1 (waveform D1). In the first bit interval, the first matched filter 170 obtains the same data chips (1, −1, −1, 1) as in the first embodiment, and correlates them with the same code chips ($C_1, C_3, C_5, C_7$) to produce the positive peak $a_1$ shown in waveform E.

The second matched filter 172 latches split electrical signal 167-2 (waveform C) in synchronization with the rising edges P', Q', R', S', . . . of the complementary clock signal 193 (waveform D2). In the first bit interval, the second matched filter 172 obtains the same data chips (−1, 1, 1, −1) as in the first embodiment, and correlates them with the same code chips ($C_2, C_4, C_6, C_8$) to produce the positive peak $b_1$ shown in waveform F.

Peaks $a_1$ and $b_1$ partially overlap to produce a reinforced positive peak $e_1$ in the output (waveform G) of the combiner 178-1 in the decision section 176. The threshold decision circuit 178-2 compares this peak $e_1$ with a threshold value to recover the first transmitted data bit ('1').

In the next bit interval, the first matched filter 170 produces a positive peak $a_2$ and the second matched filter 172 produces a positive peak $b_2$ that partially overlap to produce a reinforced positive peak $e_2$ in the output of the combiner 178-1 in the decision section 176. The threshold decision circuit 178-2 compares this peak $e_2$ with the threshold value to recover the second transmitted data bit '1'.

Continuing similarly, the first matched filter 170 produces a negative peak $a_3$ and the second matched filter 172 produces a negative peak $b_3$ that partially overlap to produce a reinforced negative peak $e_3$ in the output of the combiner 178-1 in the decision section 176. The threshold decision circuit 178-2 compares this peak $e_3$ with the same threshold value to recover the third transmitted data bit '−1'.

The decoding operation continues in this way.

In the parallel decoder of the second embodiment, the split electrical signals 167-1, 167-2 input to the first matched filter 170 and the second matched filter 172 are mutually in phase. The clock signals input to the first matched filter 170 and the second matched filter 172 are mutually shifted in phase by $\pi$ radians. Accordingly, the split electrical signals 167-1, 167-2 can be correctly latched in synchronization with the first clock signal 187-1 and the complementary second clock signal 193 just by adjusting the phase of the clock signal 183-1 output from frequency divider 182.

In practice, a phase adjuster (not shown in FIG. 9) for adjusting the phase of divided clock signal 183-1 is inserted between frequency divider 182 and splitter 186.

In the first embodiment, since the first matched filter 170 and the second matched filter 172 receive identical clock signals 187-1 and 187-2, the delayed input signal 169 and split electrical signal 167-2 must be mutually offset in phase by one chip period, or $\pi$ radians in terms of the clock period. This adjustment, which is made by the delay circuit 168, is more difficult, and requires adjustment of both the phase relationship between the delayed input signal 169 and the first clock signal 187-1 and the phase relationship between split electrical signal 167-2 and the second clock signal 187-2. In practice, a phase adjuster for adjusting the phase relationship between the delayed input signal 169 and the first clock signal 187-1 must be inserted between the delay circuit 168 and the first matched filter 170 in FIG. 6, and another phase adjuster for adjusting the phase relationship between split electrical signal 167-2 and the second clock signal 187-2 must be inserted between splitter 166 and the second matched filter 172.

The second embodiment accordingly has the advantage of requiring less hardware for timing alignment.

Third Embodiment

The structure and operation of the parallel decoder in the third embodiment will be described with reference to FIGS. 11 and 12.

Figure 11:
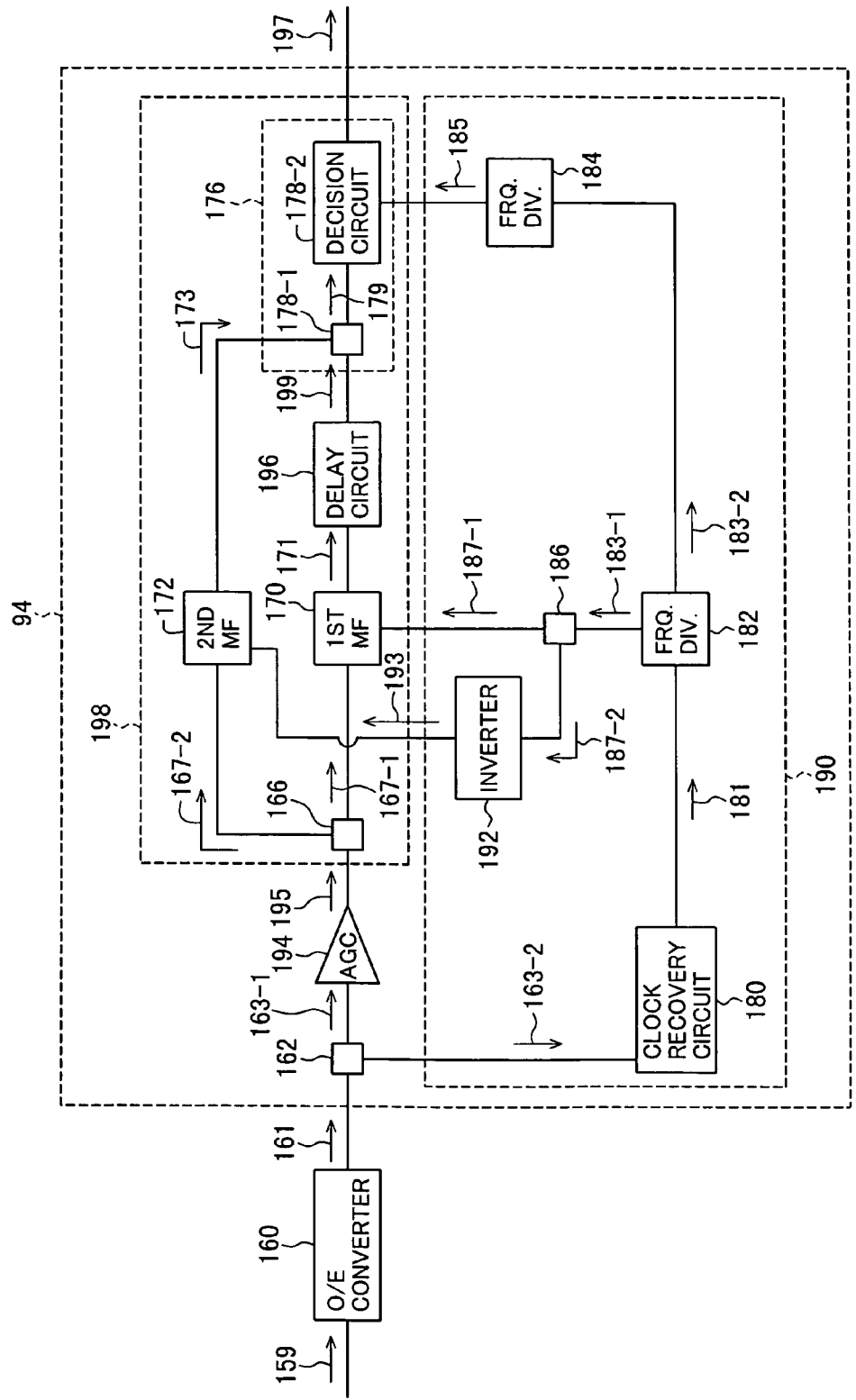
FIG. 11 is a schematic block diagram of a parallel decoder illustrating a third embodiment.
Figure 12:
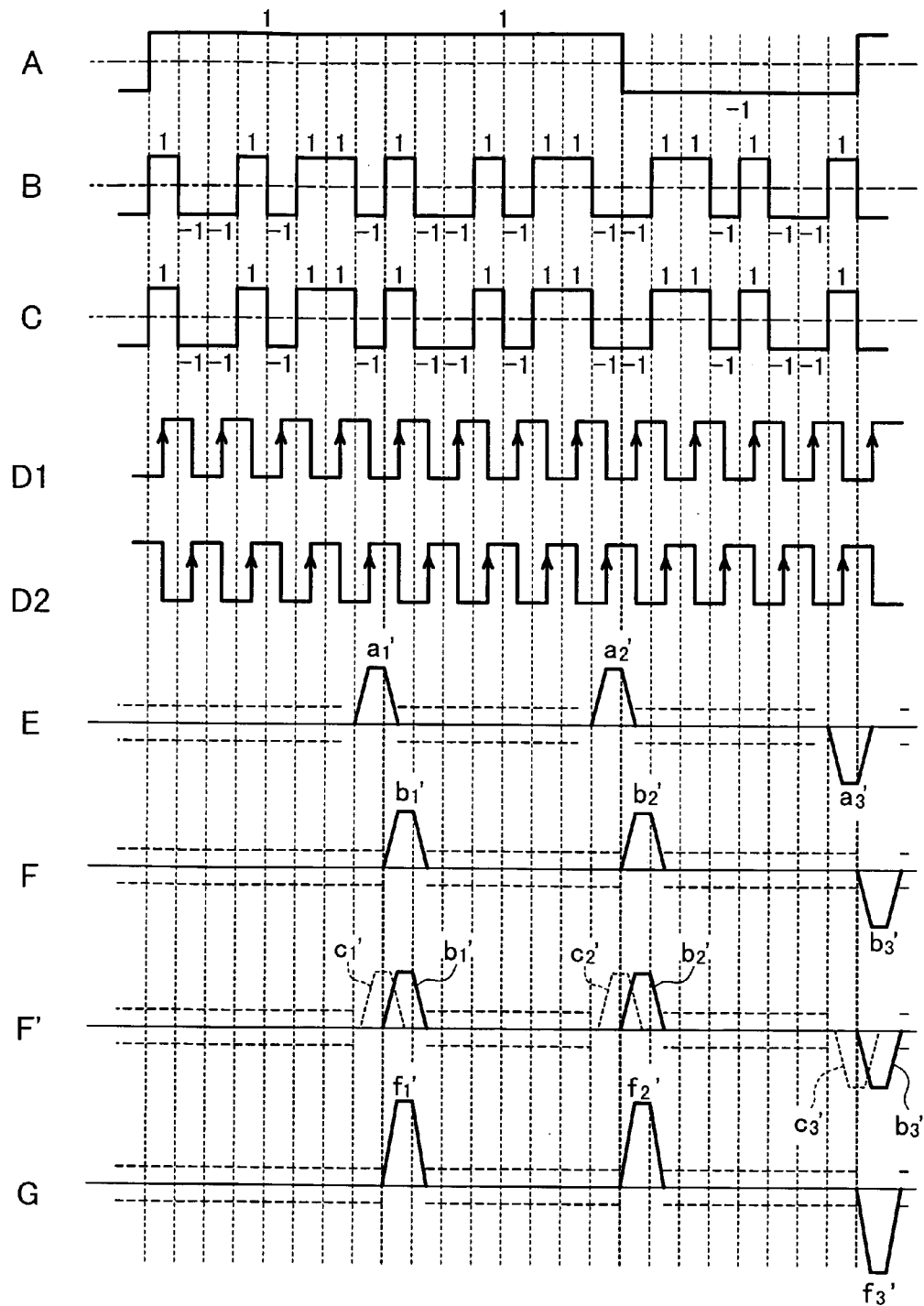
FIG. 12 is a timing diagram illustrating the operation of the parallel decoder in the third embodiment, showing temporal waveforms of a signal to be encoded and transmitted (A), the split electrical signals (B and C), the first and second clock signals (D1 and D2), the first and second correlated signals (E and F), the delayed first correlated signal (F'), and the decoded signal (G).

Referring to FIG. 11, the parallel decoder 94 in the third embodiment comprises a control signal generator 190 for generating and outputting control signals and a decoding section 198 for receiving and decoding the input electrical signal 195 and outputting the decoded signals.

This parallel decoder 94 differs from the parallel decoder 92 in the second embodiment in that the decoding section 198 includes a delay circuit 196 for delaying the first correlated signal 171 by one clock period to generate and output a delayed correlated signal 199.

In the decoding section 198, as in the first and second embodiments, the gain-adjusted electrical signal 195 is split by splitter 166 into two split electrical signals 167-1, 167-2. Split electrical signal 167-1 is supplied to the first matched filter 170, correlated, and output as the first correlated signal 171. The first correlated signal 171 is supplied to the delay circuit 196, delayed by one chip period, and output as the delayed correlated signal 199. Split electrical signal 167-2 is input to the second matched filter 172, correlated, and output as the second correlated signal 173.

The delayed correlated signal 199 and the second correlated signal 173 are input to the combiner 178-1 in the decision section 176, combined, and output as the combined correlated signal 179. The combined correlated signal 179 is input to the threshold decision circuit 178-2, thresholded, and output as the decoded data signal 197.

The operation of the third embodiment will now be described with reference to the waveforms in FIG. 12, using the same exemplary data (1, 1, 0, ...) as in the first and second embodiments.

Figure 10:
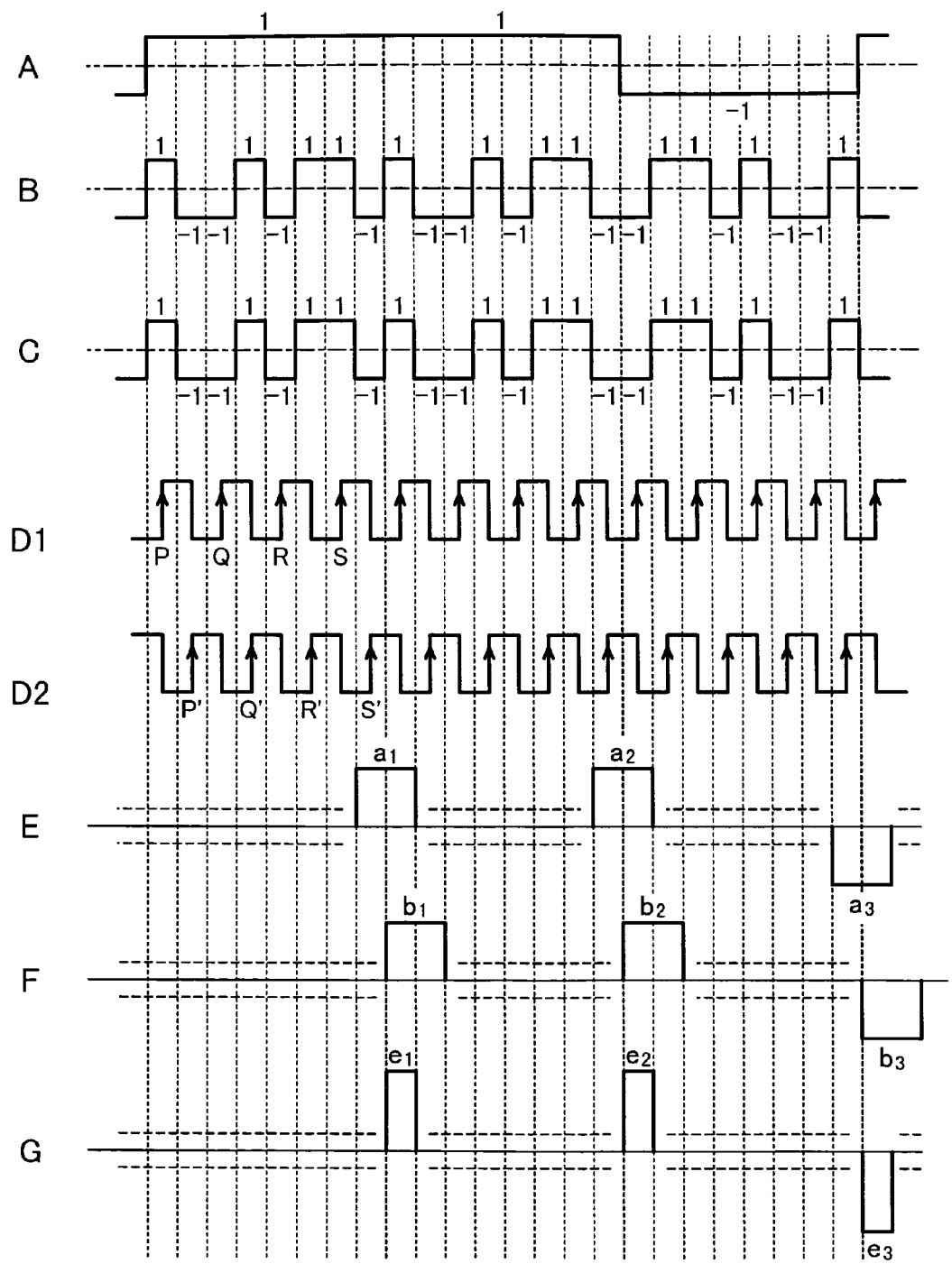
FIG. 10 is a timing diagram illustrating the operation of the parallel decoder in the second embodiment, showing temporal waveforms of a data signal to be encoded and transmitted (A), the split electrical signals (B and C), the first and second clock signals (D1 and D2), the first and second correlated signals (E and F), and the decoded signal (G)

Waveforms A to C, D1, and D2 are identical to the corresponding waveforms in FIG. 10 in the second embodiment; a repeated description will be omitted.

Waveform E is the waveform of the first correlated signal 171; waveform F is the waveform of the second correlated signal 173. Waveform F' indicates the waveform of the delayed correlated signal 199 by a dotted line overlapped on the waveform of the second correlated signal 173, which is indicated by a solid line. The one-chip delay of the delayed correlated signal 199 has been reduced to about a half-chip delay for clarity.

When the first matched filter 170 and the second matched filter 172 are analog matched filters, the peaks of the waveforms of the first and second correlated signals are not square-shaped pulses with abrupt rising and falling edges. To illustrate this, the positive and negative peaks $a_1'$, $a_2'$, $a_3'$, ..., $b_1'$, $b_2'$, $b_3'$, ..., $c_1'$, $c_2'$, $c_3'$, ..., and $f_1'$, $f_2'$, $f_3'$, ..., in waveforms E, F, F', and G are depicted as trapezoidal pulses with sloping edges. In practice, these peaks have more irregular shapes.

As in the second embodiment, peaks $a_1'$, $a_2'$, $a_3'$, ... are offset by one chip period from peaks $b_1'$, $b_2'$, $b_3'$, ....

When the first matched filter 170 and the second matched filter 172 are analog matched filters, this offset reduces the overlapping portions of the peaks in the first correlated signal 171 and the second correlated signal 173, producing less clear reinforced peaks in the combined signal 179.

The third embodiment solves this problem by delaying the first correlated signal 171 by one chip period in the delay circuit 196, thereby shifting peaks $a_1'$, $a_2'$, $a_3'$, ... to the positions indicated by $c_1'$, $c_2'$, $c_3'$, ... and securing sufficient overlap with peaks $b_1'$, $b_2'$, $b_3'$, ... even if there are irregularities in the peak waveform shapes. As a result, reinforced peaks appear more clearly in the combined correlated signal 179, enabling the threshold decision circuit 178-2 to recover the transmitted data bits with greater accuracy.

Those skilled in the art will recognize that the above embodiments can be modified in various ways within the scope of the invention, which is defined in the appended claims.

What is claimed is:

1. A parallel decoder for decoding an input electrical signal created by encoding a data signal having a bit rate with a spreading code having a chip rate, the decoder comprising:
    a control signal generator for generating, from the input electrical signal, a first clock signal having a frequency equal to half the chip rate, a second clock signal having a frequency equal to half the chip rate, and a third clock signal having a frequency equal to the bit rate; and
    a decoding section for generating a decoded signal from the input electrical signal and outputting the decoded signal, the decoding section including:
        a splitter for splitting the input electrical signal into a first electrical signal and a second electrical signal, the first electrical signal and the second electrical signal having the same waveform and the same phase,
        a first matched filter operating in synchronization with the first clock signal to receive the first electrical signal and to generate a first correlated signal from the first electrical signal,
        a second matched filter operating in synchronization with the second clock signal to receive the second electrical signal and to generate a second correlated signal from the second electrical signal, and
        a decision section operating in synchronization with the third clock signal to generate the decoded signal from the first correlated signal and the second correlated signal.

2. The parallel decoder of claim 1, wherein the decoding section further includes a delay circuit inserted between the splitter and the first matched filter for delaying the first electrical signal by one chip period.

3. The parallel decoder of claim 1, wherein the first clock signal and the second clock signal are mutually in phase.

4. The parallel decoder of claim 1, wherein the first clock signal and the second clock signal are mutually complementary.

5. The parallel decoder of claim 4, wherein the control signal generator includes an inverter for generating the second clock signal from the first clock signal.

6. The parallel decoder of claim 4, wherein the decoding section further includes a delay circuit inserted between the first matched filter and the decision section to delay the first correlated signal by one chip period.

7. The parallel decoder of claim 1, wherein the first matched filter and the second matched filter are analog matched filters.

8. The parallel decoder of claim 7, wherein the decision section comprises:
    a combiner for additively combining the first correlated signal and the second correlated signal to generate a combined signal; and
    a threshold decision circuit for comparing the combined signal with a threshold level in synchronization with the third clock signal to generate the decoded signal, the decoded signal having one value when the combined signal exceeds the threshold level and another value when the combined signal is less than the threshold level.

9. The parallel decoder of claim 1, wherein each of the first matched filter and the second matched filter separately comprises:
    a shift register having a set of cells generating respective output signals;
    a signal combiner for additively combining the output signals of a first subset of the cells in the shift register to generate a first sum signal;
    a signal combiner for additively combining the output signals of a second subset of the cells in the shift register to generate a second sum signal;
    a non-inverting amplifier for amplifying the first sum signal to generate a first amplified signal;
    an inverting amplifier for inverting and amplifying the second sum signal to generate a second amplified signal; and
    an analog adder for additively combining the first and second amplified signals.

10. The parallel decoder of claim 1, wherein the first and second matched filters are digital matched filters.

11. The parallel decoder of claim 10, wherein the first and second correlated signals are bi-level signals.

12. The parallel decoder of claim 10, wherein the decision section includes a logic gate for performing a logic operation on the first and second correlated signals to generate a combined signal.

13. The parallel decoder of claim 12, wherein the logic operation is an AND operation.

14. The parallel decoder of claim 12, wherein the decision section further includes a threshold decision circuit for latching the combined signal with a threshold level in synchronization with the third clock signal to generate the decoded signal.

15. A parallel decoder for decoding an input electrical code division multiplexing (CDM) signal created by encoding a data signal having a bit rate with a spreading code having a chip rate, the decoder comprising:
   a control signal generator for generating, from the input electrical CDM signal, a first clock signal having a frequency equal to half the chip rate, a second clock signal having a frequency equal to half the chip rate, and a third clock signal having a frequency equal to the bit rate; and
   a decoding section for generating a decoded signal from the input electrical CDM signal and outputting the decoded signal, the decoding section including:
      a splitter for splitting the input electrical CDM signal into a first electrical signal and a second electrical signal, the first electrical signal and the second electrical signal having the same waveform and the same phase,
      a first matched filter operating in synchronization with the first clock signal to receive the first electrical signal and to generate a first correlated signal from the first electrical signal,
      a second matched filter operating in synchronization with the second clock signal to receive the second electrical signal and to generate a second correlated signal from the second electrical signal, and
      a decision section operating in synchronization with the third clock signal to generate the decoded signal from the first correlated signal and the second correlated signal.

* * * * *